United States Patent
Durth

(10) Patent No.: US 6,595,112 B2
(45) Date of Patent: Jul. 22, 2003

(54) COOKING DEVICE WITH REGISTRATION OF THE AMOUNT OF WATER

(75) Inventor: Wilfried Durth, Landsberg (DE)

(73) Assignee: Rational Aktiengeselleshaft, Landsberg/Lech (DE)

( * ) Notice: Subject to any disclaimer, the term of this patent is extended or adjusted under 35 U.S.C. 154(b) by 0 days.

(21) Appl. No.: 09/898,591

(22) Filed: Jul. 3, 2001

(65) Prior Publication Data

US 2002/0017199 A1 Feb. 14, 2002

(30) Foreign Application Priority Data

Jul. 3, 2000 (DE) .......................................... 100 43 771

(51) Int. Cl.7 .............................. A47J 27/04; A47J 37/00
(52) U.S. Cl. .............................. 99/330; 99/468; 99/516; 99/340; 126/369; 219/401

(58) Field of Search ........................ 99/330, 340, 476, 99/467, 468, 516, 483; 126/369, 20, 21 A, 348; 219/385, 400, 401, 492; 392/492, 400, 399, 394; 239/461, 509

(56) References Cited

U.S. PATENT DOCUMENTS

| | | | | |
|---|---|---|---|---|
| 4,649,898 A | * | 3/1987 | Martinson | 126/369 |
| 5,768,982 A | * | 6/1998 | Violi et al. | 99/476 |
| 6,213,002 B1 | * | 4/2001 | Batten et al. | 99/340 |
| 6,250,215 B1 | * | 6/2001 | Brenn | 99/468 |

* cited by examiner

Primary Examiner—Reginald L. Alexander
(74) Attorney, Agent, or Firm—Schiff Hardin & Waite

(57) ABSTRACT

A cooking device which has at least one water feeder, at least one drain and at least one exhaust connected to the cooking chamber includes an arrangement for registering and measuring the amount of water that is supplied to the cooking device and the amount of liquid being discharged from the cooking device in the form of water, steam and moisture.

19 Claims, 1 Drawing Sheet

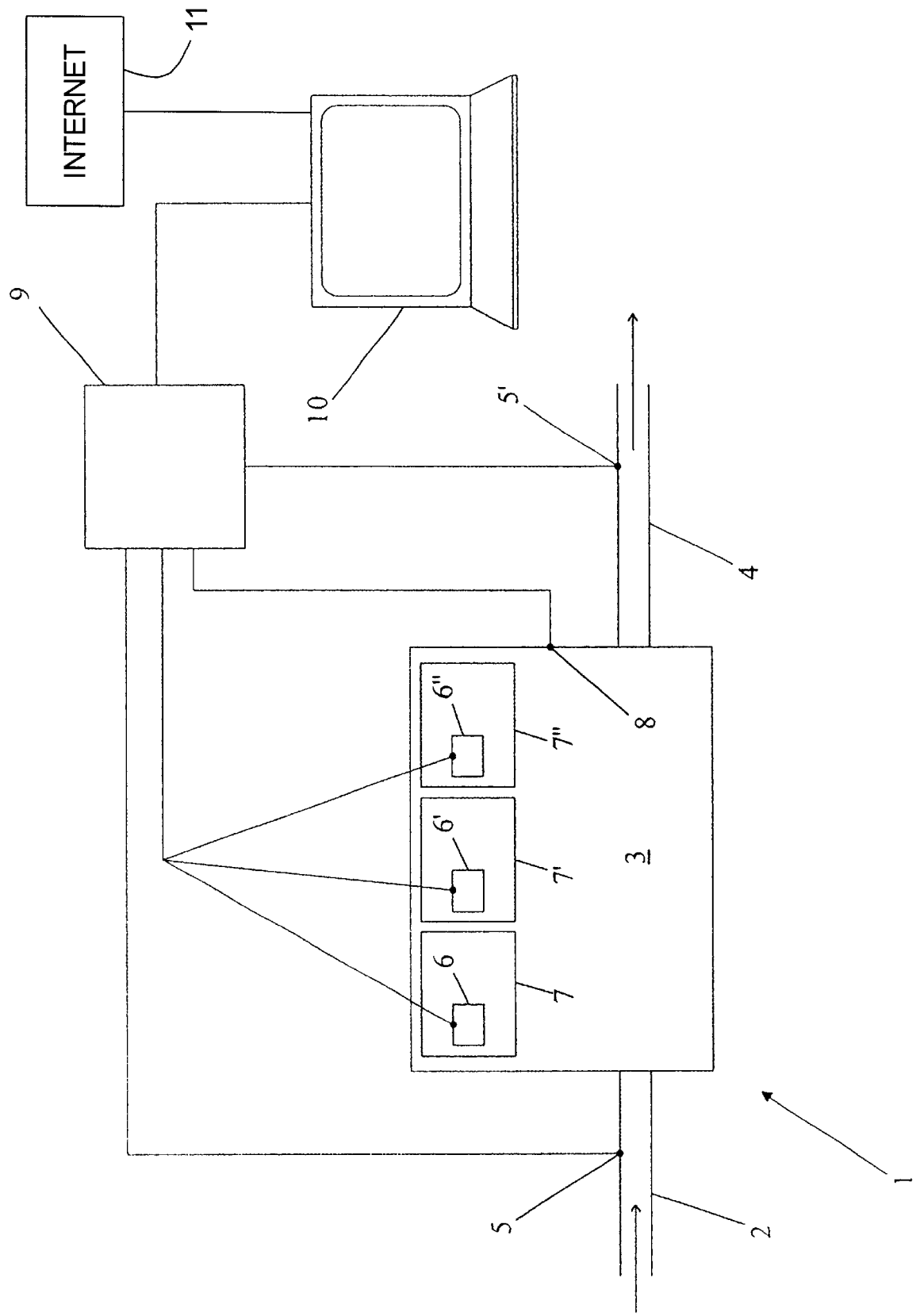

COOKING DEVICE WITH REGISTRATION OF THE AMOUNT OF WATER

BACKGROUND OF THE INVENTION

The present invention is directed to a cooking device having a cooking chamber with at least one water inlet, at least one water outlet and at least one exhaust.

Cooking devices with a cooking chamber having at least one water inlet, at least one water outlet and an exhaust are generally known; however, the incoming water or, respectively, outgoing water cannot be exactly measured or controlled and/or regulated.

Water is needed within a cooking device for fulfilling a number of tasks. The supply of water is necessary, particularly with respect to a steaming operation in the cooking device or with respect to a quenching or chilling operation. In addition, water is used for potential automatic cleaning of the cooking device, for a decalcification means within the cooking device, for a softening apparatus or for a metering device for a hand shower or nozzle for finishing sauces.

It is desirable to determine the amount of water consumption of a cooking device or the difference between the amount of incoming water and the amount of water being removed from the cooking device, particularly for enabling a long runtime of the cooking device, for facilitating telediagnostic services with respect to the customer and for saving energy. It is also desirable with respect to the above-described specific operative range of water within a cooking device to be able to exactly acquire or determine the respectively required amount of water or, respectively, the used amount of water, so that the acquisition of water consumption data, in particular, could be advantageous via a computer.

SUMMARY OF THE INVENTION

An object of the present invention is to provide a cooking device having a device for registering the amount of water with which the supplied amount of water or the amount of water that can be supplied is determined for the cooking device and also for individual devices within the cooking device and to determine the discharge amount of water or the amount of water that can be discharged and the amount of steam and/or moisture emerging from the cooking device.

The object is inventively achieved by a device for registering the amount of water comprising at least one measuring device for acquiring the amount of water being either supplied to the cooking device or the amount of water that can be supplied to the cooking device, a measuring device for acquiring the amount of water being discharged out of the cooking device or the amount of water that can be discharged out of the cooking device and/or for acquiring the amount of steam and/or moisture emerging from the cooking device.

It can be provided that the measuring device has at least one liquid flow sensor, a water level sensor and/or a moisture sensor.

It is inventively preferred that at least one liquid flow sensor, such as a pulse counter or the like, cooperates with the water feeder and/or the outlet and/or that at least one moisture sensor is arranged in the cooking chamber in a drain or in an exhaust for the chamber.

Furthermore, the invention is characterized by at least one measuring device for a cooking device having at least one water-consuming device selected from at least one quenching or chilling nozzle, a steaming nozzle, a cleaning nozzle, a hand shower or the like, for acquiring the amount of water that can be supplied to the water-consuming device and/or the amount of water supplied to the water-consuming device, the amount of water that can be discharged out of the water-consuming device and/or the amount of water discharged out of the water-consuming device and the amount of steam and/or moisture emerging from the water-consuming device.

It can be provided that the water-consuming device comprises a cooling device, a quenching device, a steaming device, a cleaning device, a decalcification device, a softening device and/or a metering device, particularly for a hand shower for finishing sauces.

It is also inventively preferred that the device for registering the amount of water has at least one controller and/or regulating device cooperating with at least one (preferably every) measuring device, particularly for controlling and/or regulating a cooking process, a moistening process, a drying process, a cleaning process, a decalcification process, a softening process and the like.

It can be provided that the device for registering the amount of water has at least one display unit cooperating with the at least one (preferably every) measuring device, particularly for displaying a water flow amount, water consumption and/or content of moisture.

Finally, it is inventively provided that the control device and/or the regulating device and/or the at least one display unit is connected to a computer or is surrounded by it.

The embodiments of the invention can also be characterized in that the device for registering the amount of water has an interface for connecting to the internet, preferably via a computer. This is particularly useful for telediagnostic service, which diagnoses problems of a device from a remote location by using information on telephone or cable lines, providing remote maintenance and the like for the cooking device.

Therefore, the invention is based on the surprising knowledge that the amount of water which can be supplied to the cooking device or is supplied to the cooking device, as well as the amount of water, which can be discharged and/or is discharged, can be acquired with the aid of the measuring devices, whereby the measuring devices can also regulate or control individual amounts of water that are to be supplied for specific devices within the cooking device.

The inventive device for registering the amount of water in a cooking device enables a longer runtime of the cooking device. On the basis of the data displayed by the control and/or regulating device, it is also possible to facilitate the telediagnostic services for customers. Furthermore, since the amount of water required for the cooking device can be exactly regulated and/or controlled, the inventive device makes it possible to save energy. A remote monitoring is particularly facilitated by using a computer which is provided with an internet interface, and this remote monitoring enables service personnel to monitor the device and diagnose any problems which can occur.

Additional features and objects of the present invention will be readily apparent from the following description of the preferred embodiment, the drawing and the claims.

BRIEF DESCRIPTION OF THE DRAWING

The FIGURE is a diagrammatic illustration of a cooking device with the inventive devices for registering the amount of water.

DESCRIPTION OF THE PREFERRED EMBODIMENT

The principles of the present invention are particularly useful in a cooking device 1 having a water feeder 2 for supplying water into a cooking chamber 3, which has a drain 4. A measuring device, such as a liquid flow sensor 5, is arranged in the water feeder 2, while a liquid flow sensor 5' is located in the drain 4. These two sensors or measuring devices can be pulse counters. A moisture sensor or measuring device 8 is arranged at the wall of the cooking chamber 3 and the liquid sensors 5 and 5' as well as the moisture sensor 8 are connected to a control and/or regulating device 9. Water-consuming devices, such as a cleaning device 7, a quenching or chilling device 7' and a moisture supply device 7", are arranged within the cooking device. These water-consuming devices could also be a cooling device, a decalcification device, a softening device and/or a metering device, particularly for a hand shower or nozzle for finishing sauces. Liquid flow sensors or measuring devices 6, 6' and 6" are arranged in the water-consuming devices 7, 7' and 7", and, preferably, they are arranged so that the water initially flows through them before it reaches the corresponding water-consuming device.

A computer 10, which preferably has an interface for a connection to the internet 11, is connected to the control and regulating device 9, as shown in the figure.

The cooking device 1 operates with the measuring devices or flow sensors 5, 5', 6, 6' and 6" as well as the moisture sensor 8 as follows. The amount of water which is to be introduced into the cooking device 1 is determined with the aid of the liquid flow sensor 5 and the water feeder 2. The amount of water, for example in the form of a condensate, which is brought out of the cooking device 1, is determined with the aid of the liquid flow sensor 5' in the drain 4. It is, thus, possible to determine the overall water consumption of the cooking device 1, as well as the difference of the amount of water introduced by the water feeder 2 and the water that is removed by the drain 4. Depending on the intended use of the cooking device 1, the water flow through the cooking device can be exactly regulated or, respectively, controlled with the aid of the control and/or regulating device 9.

It is possible with the inventive cooking device to determine the amount of water supplied to the cooking device and the amount of water that can be supplied to the cooking device by corresponding water level sensors, for example. The same is true for the discharging water of the drain 4. In addition, it is possible with the control and/or regulating device 9 to exactly regulate and/or control the water consumption of specific water-consuming devices 7, 7' and 7" within the cooking device 1 via the liquid flow sensors 6, 6' and 6". For example, the required amount of water for filling a cleaning device 7, a quenching device 7' and/or a steaming device 7" can be controlled and/or regulated and, therefore, the exact amount of water that is to be used for cleaning, quenching and/or steaming is controlled.

Depending on the moisture in the cooking chamber 3, which can be determined via the moisture sensor 8, a steaming amount, in particular, that is introduced into the cooking device 1 via the steaming device 7", such as a steam generator, can be regulated. Thus, a precise adjustment of the respective cooking process is enabled and has an effect on the baking result, for example.

On the basis of the inventive device for registering the amount of water, it is, as mentioned above, possible to control quenching during a cooking process given a defined quenching or chilling time. It is thus possible to detect differences and potential defects. The quenching temperature reached with a specific amount of water allows conclusions from the observed facts with respect to the cooking item.

A metering device (not shown) for the hand shower for finishing sauces can also be regulated and/or controlled so that the production of sauces is facilitated as a result of the exact control of the supplied amount of water.

The use of the computer 10 makes an excellent monitoring of the cooking device 1 possible. If the computer also has an interface for an internet connection, the cooking device 1 can be customer service-friendly and cost-effectively remotely monitored and can be potentially controlled without a monitoring service or a repair service being necessary "on the spot".

Although various minor modifications may be suggested by those versed in the art, it should be understood that I wish to embody within the scope of the patent granted hereon all such modifications as reasonably and properly come within the scope of my contribution to the art.

I claim:

1. A cooking device having a cooking chamber with at least one water feeder, at least one drain and at least one exhaust, the improvements comprising a device for registering the amount of water comprising at least one measuring device for acquiring the amount of water supplied to the cooking chamber and the amount of liquid in the form of water, steam and moisture being discharged from the cooking chamber, the measuring device being at least one sensor selected from a liquid flow sensor, a water level sensor and a moisture sensor, said measuring device having at least one liquid flow sensor cooperating with the water feeder and the drain and at least one moisture sensor being arranged in one of the cooking chamber, the drain and the exhaust.

2. A cooking device according to claim 1, which includes at least one water-consuming device in the cooking chamber, said water-consuming device being selected from a group consisting of a cooling device, a quenching device, a steaming device, a cleaning device, a decalcification device, a softening device, a quenching nozzle, a steaming nozzle, a cleaning nozzle and a hand shower, said water-consuming device having at least a measuring device for determining one of the amount of water being supplied to the water-consuming device and the amount of liquid being discharged from the water-consuming device in the form of water, steam and moisture.

3. A cooking device according to claim 2, wherein the water-consuming device is selected from a quenching nozzle, a steaming nozzle, a cleaning nozzle and a hand shower.

4. A cooking device according to claim 1, wherein a device for registering the amount of water has at least one control and regulating device cooperating with at least one measuring device for controlling and regulating a process selected from a cooking process, a moisturizing process, a drying process, a cleaning process, a decalcification process and a softening process.

5. A cooking device according to claim 1, wherein the device for registering the amount of water has at least one display unit cooperating with the at least one measuring device for displaying at least the water flow amount, the water consumption and the moisture content.

6. A cooking device according to claim 5, wherein the at least one display unit is connected to a computer.

7. A cooking device according to claim 6, wherein the computer has an interface for internet connection to enable a remote monitoring of the cooking device.

8. A cooking device according to claim 4, wherein the control and regulating device has at least one display unit connected to a computer.

9. A cooking device according to claim 8, wherein the computer has an interface for internet connection to enable a monitoring of the cooking device from a remote location.

10. A cooking device having a cooking chamber with at least one water feeder, at least one drain and at least one exhaust, the improvements comprising a device for registering the amount of water comprising at least one measuring device for acquiring the amount of water supplied to the cooking chamber and the amount of liquid in the form of water, steam and moisture being discharged from the cooking chamber, the device for registering the amount of water having at least one control and regulating device cooperating with at least one measuring device, the control and regulating device having at least one display unit connected to a computer, said computer having an interface for internet connection to enable a monitoring of the cooking device from a remote location.

11. A cooking device according to claim 10, wherein the measuring device is selected from at least one liquid flow sensor, a water level sensor and a moisture sensor.

12. A cooking device according to claim 11, wherein at least one liquid flow sensor cooperates with the water feeder and the drain and at least one moisture sensor is arranged in one of the cooking chamber, the drain and the exhaust.

13. A cooking device according to claim 10, which includes at least one water-consuming device in the cooking chamber, said water-consuming device being selected from a group consisting of a cooling device, a quenching device, a steaming device, a cleaning device, a decalcification device, a softening device, a quenching nozzle, a steaming nozzle, a cleaning nozzle and a hand shower, said water-consuming device having at least a measuring device for determining one of the amount of water being supplied to the water-consuming device and the amount of liquid being discharged from the water-consuming device in the form of water, steam and moisture.

14. A cooking device according to claim 13, wherein the water-consuming device is selected from a quenching nozzle, a steaming nozzle, a cleaning nozzle and a hand shower.

15. A cooking device according to claim 12, wherein the control and regulating device is for controlling and regulating a process selected from a cooking process, a moisturizing process, a drying process, a cleaning process, a decalcification process and a softening process.

16. A cooking device according to claim 13, wherein the device for registering the amount of water has at least one display unit cooperating with the at least one measuring device for displaying at least the water flow amount, the water consumption and the moisture content.

17. A cooking device having a cooking chamber with at least one water feeder, at least one drain and at least one exhaust, the improvements comprising a device for registering the amount of water comprising at least one measuring device for acquiring the amount of water supplied to the cooking chamber and the amount of liquid in the form of water, steam and moisture being discharged from the cooking chamber, the device for registering the amount of water has at least one display unit cooperating with the at least one measuring device for displaying at least the water flow amount, the water consumption and the moisture content.

18. A cooking device according to claim 17, wherein the at least one display unit is connected to a computer.

19. A cooking device according to claim 18, wherein the computer has a interface for internet connection to enable a remote monitoring of the cooking device.

* * * * *